United States Patent [19]
Sutherland

[11] Patent Number: 5,592,103
[45] Date of Patent: Jan. 7, 1997

[54] SYSTEM FOR FAST SWITCHING OF TIME CRITICAL INPUT SIGNALS

[75] Inventor: Ivan E. Sutherland, Santa Monica, Calif.

[73] Assignee: Sun Microsystems, Inc., Mountain View, Calif.

[21] Appl. No.: 499,407

[22] Filed: Jul. 3, 1995

Related U.S. Application Data

[63] Continuation-in-part of Ser. No. 140,654, Oct. 21, 1993, and a continuation-in-part of Ser. No. 140,655, Oct. 21, 1993.

[51] Int. Cl.$^6$ ................................................. H03K 19/01
[52] U.S. Cl. ................................. 326/17; 326/21; 326/93
[58] Field of Search ................................. 326/17, 71, 93, 326/98

[56] References Cited

U.S. PATENT DOCUMENTS

| | | | |
|---|---|---|---|
| 4,899,066 | 2/1990 | Aikawa et al. | 326/98 |
| 4,940,908 | 7/1990 | Tran | 326/17 |
| 5,121,003 | 6/1992 | Williams | 326/17 |
| 5,389,835 | 2/1995 | Yetter | 326/98 |

*Primary Examiner*—David R. Hudspeth
*Attorney, Agent, or Firm*—Townsend and Townsend and Crew LLP

[57] ABSTRACT

A technique is provided for switching circuitry in a manner which allows the circuit to respond quickly to changes in some critical input signals expected to arrive last. In the preferred embodiment the circuits of this invention are provided in triple logic column form. A circuit will typically include at least two logic columns, each having three portions serially coupled between a high and a low potential source. The middle portion of each logic column is connected to the output node and to receive the critical input signal expected to arrive last, or the input signal with the critical timing requirement. The upper and lower portions of each logic column are connected to receive the remaining input signals, that is those input signals not expected to be changing at the time the critical input signal is received. Thus, the state of the upper and lower portions of the logic column can be "set-up" in advance, in readiness for the critical input condition. Typically, the invention provides three logic columns - - - one logic column for causing the output to follow changes in the state of the critical input signals, one logic column for causing the output to have a state which is the reverse of the state of the critical input signals, and a final logic column for holding the condition of the output constant regardless of changes in the state of the critical input signals.

20 Claims, 6 Drawing Sheets

SYSTEM FOR FAST SWITCHING OF TIME CRITICAL INPUT SIGNALS

CROSS-REFERENCE TO RELATED APPLICATION

This is a continuation-in-part patent application of Ser. No. 08/140,654, filed Oct. 21, 1993, entitled "Counterflow Pipeline"; and Ser. No. 08/140,655, filed Oct. 21, 1993, entitled "Counterflow Pipeline Processor."

BACKGROUND OF THE INVENTION

This invention relates to electronic circuits, and in particular to a type of circuit which allows switching of an output signal quickly upon the arrival of a particular input signal.

In the design of asynchronous circuitry, it is desirable to provide circuits which switch very quickly after arrival of a particular input signal, frequently referred to herein as the "critical" input signal. For example, the designer of a system will often be aware that a particular input signal typically arrives last among a group of input signals. It is therefore desirable to allow the system to react as quickly as possible to that last arriving critical signal so that the next operation to be performed can start as soon as possible.

One well known circuit which lacks this capability, but which is of similar form, is a carry chain circuit such as found in an adder. A carry chain circuit typically consists of an inverter coupled to receive an input carry bit together with suitable logic coupled to the inverter to receive the bits to be added. In a multiple bit adder many such circuits are serially connected to each other, enabling the carry bit to propagate from stage to stage. An example of this circuit is described by Neil H. E. Weste and Kamran Eshraghian in *Principles of CMOS VLSI Design - - - A Systems Perspective*, Addison-Wesley Publishing Co., Reading, Mass. (1988), pp. 311–314.

SUMMARY OF THE INVENTION

This invention provides a technique for designing and implementing circuitry in a manner which allows a circuit to respond quickly to changes in particular input signals which are usually received after other input signals are received. In the preferred embodiment the circuits of this invention are provided in logic column form. Preferably three logic columns, but sometimes fewer or more than three logic columns, are coupled together with each providing a specific function - - - a first logic column for causing the output node to follow changes in the state of the critical input signals, a second logic column for causing the output node to follow a state which is the reverse of the state of the critical input signals, and, usually, a final logic column for holding the condition of the output node constant regardless of changes in the state of the critical input signal.

Each logic column, in turn, typically includes an output node and three portions serially coupled between a high and a low potential source. The middle portion of each logic column is connected to the output node and to receive the input signal expected to arrive last, which typically will be the input signal with the critical timing requirement. The upper and lower portions of each logic column are connected to receive the remaining input signals, that is, those input signals expected already to be stable at the time the critical input signal is received. Thus, the state of the upper and lower portions of the logic column can be established in advance, in readiness for the critical input condition. Effectively, the upper and lower portions of the column enable the inverter to react to the critical input signal. By connecting the output node from each column in parallel, the critical input signal can switch the state of the output node quickly.

In one preferred embodiment a circuit according to the invention includes a signal output node, a first logic column, and a second logic column. The first logic column includes a first inverter, first logic, and a first logic column output node connected to the signal output node. The first logic column is connected to receive first logic column input signals and in response supply a first logic column output signal to the first logic column output node. Usually all but one of the first logic column input signals are supplied to the first logic, and one first logic column input signal (the time critical input signal) is supplied to the first inverter. The second logic column includes a second inverter, second logic, and a second logic column output node also connected to the signal output node. Like the first logic column, the second logic column is connected to receive second logic column input signals and in response supply a second logic column output signal to the second logic column output node. Also like the first logic column, usually all but one of the second logic column input signals are supplied to the second logic, and an inverted form of the time critical input signal is supplied to the second inverter.

In another embodiment the invention provides a three logic column circuit which includes an output node and three logic columns. The first logic column is connected to the output node and connected to receive first logic column input signals and in response thereto control the potential of the output node. The first logic column raises the potential of the output node in response to increases in the potential of the critical first logic column input signals, and lowers the potential of the output node in response to decreases in the potential of the first logic column critical input signals. The second logic column is also connected to the output node and to receive second logic column input signals. In response the second logic column controls the potential of the output node. The second logic column raises the potential of the output node in response to decreases in the potential of the second logic column critical input signal, and lowers the potential of the output node in response to increases in the potential of the second logic column critical input signals. Finally, the third logic column is also connected to the output node and to receive third logic column input signals. In response the third logic column holds the potential of the output node constant despite changes in the state of the third logic column input signals.

DESCRIPTION OF THE SPECIFIC EMBODIMENTS

Figure 1:
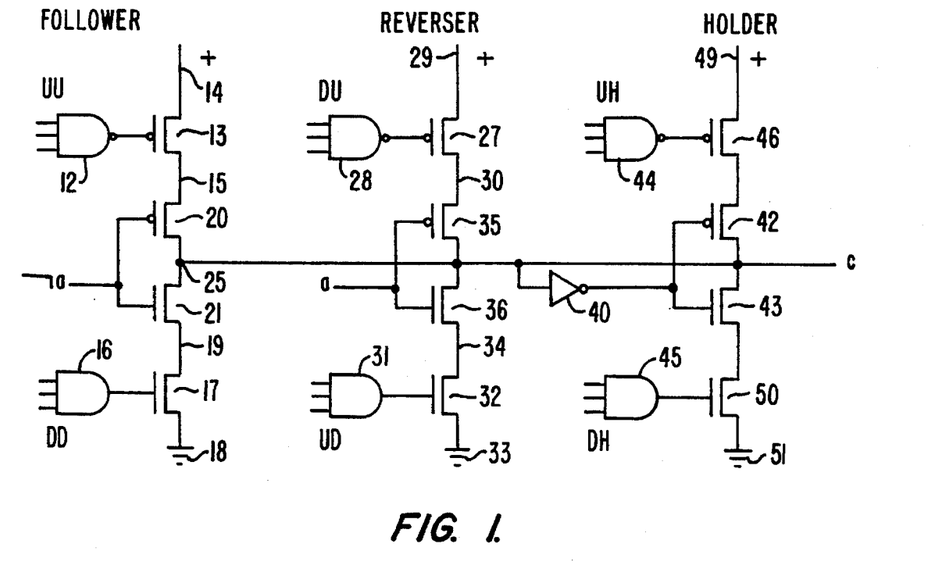
FIG. 1 is a circuit schematic illustrating a triple logic column circuit as used in the preferred embodiment.

FIG. 1 is a circuit schematic illustrating a triple logic column circuit. For convenience the term "logic column" is used herein to refer to one of the "columns" of circuitry shown. For example, one logic column of the triple logic column is provided by the logic designated UU, DD, and the inverter (transistors 20 and 21 and the interconnections) between UU and DD. The circuit shown in FIG. 1 includes three logic columns designated follower, reverser, and holder. An output node c provides the output signal from the complete circuit of FIG. 1. For the circuit depicted, "non-critical" input signals are provided to each of the logic columns to logic gates in the outer portions of each logic column. The critical input signal is applied to the inverter in the central portion of that logic column. The detailed operation and advantages of this form of circuit are described in more detail below.

For each of its output signals, a triple logic column circuit distinguishes six cases referred to herein as DD, DU, UD, UU, UH and DH. These cases are distinguished by variables not expected to be changing at the time the triple logic column circuit acts. In other words, the input signals applied to logic UU, DD, DU, UD, U and DH are input signals whose states are not expected to be changing at the time circuit shown in FIG. 1 is expected to act. At the time the circuit is expected to ac of these input signals applied to the logic UU, DD, DU, etc., will have been applied to the circuitry, and the circuitry will be in a steady state condition. The six cases are:

DD=a down change in the input will drive the output down

DU=a down change in the input will drive the output up

UD=an up change in the input will drive the output down

UU=an up change in the input will drive the output up

UH=an up change in the input

DH=a down change in the input will leave the output constant

For the circuit shown in FIG. 1, those noncritical input signals for which when critical input signal a rises, it is desired that the output signal c rise, are collected and applied to logic UU. Those noncritical input signals for which when critical input signal a falls, it is desired that the output signal c rise, are collected and applied to logic DU. Similarly, those noncritical input signals for which when critical input signal a falls, it is desired that the output signal c fall, are collected and applied to logic DD, etc. Stated differently, the noncritical input signals can be viewed as conditioning or powering the inverter in that column. For example, for the second column, only when the noncritical input signals have turned on transistors 27 and 32 can the presence of critical input signal a change the state of the output node c.

It should be understood that the logic shown in the figure, for example gate 12 for UU, is merely illustrative, not complete. Any desired logic can be used. Furthermore, such logic may be implemented in any desired form, for example, as a read only memory, as a programmable logic device, as random logic, as a gate array, etc.

The critical input signal is one which the designer of the circuit determines to be an input signal after the arrival of which the circuit is to operate as quickly as possible. One reason for this desired behavior is that the designer of the circuit may know that among all of the input signals (those signals supplied to the logic at the outside of the logic columns and the one signal supplied to the inverters), the critical input signal typically will be the last to arrive. These time critical input signals are preferably applied to the inverters in the logic columns. Thus, as shown in FIG. 1, input signal a is applied to the inverter between logic DU and UD, while the complementary input signal ¬a, is applied to the inverter between logic UU and DD.

The structure and operation of the circuit shown in FIG. 1 is described in more detail below. The "follower" logic column of the circuit shown in FIG. 1 causes the output c to follow the critical input signal to this logic column. In other words, a rising critical input signal causes output c to rise, while a falling input signal causes output c to fall. The follower circuit includes an upper and lower portion surrounding an inverter. The upper portion of the circuit includes a NAND gate 12, having a desired number of input nodes, and controlling a PMOS transistor 13 coupled between a positive voltage 14 and a node 15. This logic circuit (the NAND gate) is shown simply for illustration. As will be evident below, all that is needed for the UU logic is whatever logic is necessary to turn on transistor 13 when a rising condition in critical input a is to raise the state of the output signal c. Thus, if the input signals to the UU logic consists of only a single signal, that signal can directly control transistor 13, and no other "logic" is necessary. Finally, if there are many input signals for logic UU, it can have a more complex form, consisting itself of as many gates as necessary.

The lower portion of the follower logic column includes an AND gate 16, also with as many input terminals as necessary, controlling an NMOS transistor 17, in turn coupled between a negative potential, typically ground 18 and a node 19. As described above, this logic also can take other forms as well. Between nodes 15 and 19, an inverter is coupled. The inverter includes a PMOS transistor 20 coupled between node 15 and an output node 25 for the logic column, and an NMOS transistor 21 coupled between node 19 and node 25. The gates of PMOS transistors 20 and 21 are coupled together to receive an input signal which is the complement of a. Complementary signals are designated herein and in the Figures with the symbol "¬". As described above, the complementary input ¬a typically will be a time critical signal, while the input signals to AND gate 16 will be signals which are not expected to be varying at the time the triple logic column circuit acts.

The second logic column of the circuit shown in FIG. 1 is the "reverser" logic column. This logic column will drive the output signal c high in response to a falling critical input signal, and drive the output c low in response to a rising critical input signal. In a similar manner to that described above, the reverser logic column provides two portions in which the upper portion is labeled DU and the lower portion UD. The upper portion DU allows a falling critical input signal to drive the output c high, while the lower portion allows a rising critical input signal to drive the output c low. In a manner similar to the follower logic column, the reverser logic column includes a PMOS transistor 27 coupled to NAND gate 28, to a positive potential 29, and a node 30. Similarly, the lower portion of the reverser circuit includes an AND gate 31 coupled to control the gate of NMOS transistor 32. The NMOS transistor is coupled between a negative potential, typically ground 33 and a node 34. Between nodes 30 and 34, an inverter, consisting of PMOS transistor 35 and NMOS transistor 36, is provided. The output of the inverter is also coupled to node 25 to provide output signal c. The input of the inverter is coupled to receive input signal the typically time critical input signal a.

The third logic column of the circuit shown in FIG. 1 is a "holder" circuit. The holder circuit does not change the output c even when the critical input signals to either logic columns change. As shown in FIG. 1, the holder circuit includes an inverter 40 driving the input terminal of another inverter consisting of PMOS transistor 42 and NMOS transistor 43. The two inverters chained together hold the output c constant despite changes in the input signals to NAND gate 44 and AND gate 45. As shown in the figure, NAND gate 44 controls a PMOS transistor 46 coupled between a positive potential 49 and transistor 42. Similarly, AND gate 45 controls NMOS transistor 50 coupled between ground 51 and transistor 43. Of course, typically positive potential supplies 14, 29, and 49 will be a single potential source, and negative potential sources 18, 33, and 51 will be a single negative potential source.

At the time the circuit typified by FIG. 1 is designed, care will be taken to assure that the noncritical input signals are properly grouped. For the circuit to function properly, at most only one inverter will be enabled or powered. That is, at most only one pair of transistors 13 and 17, transistors 27 and 37, and transistors 46 and 50 will be on.

Figure 2:
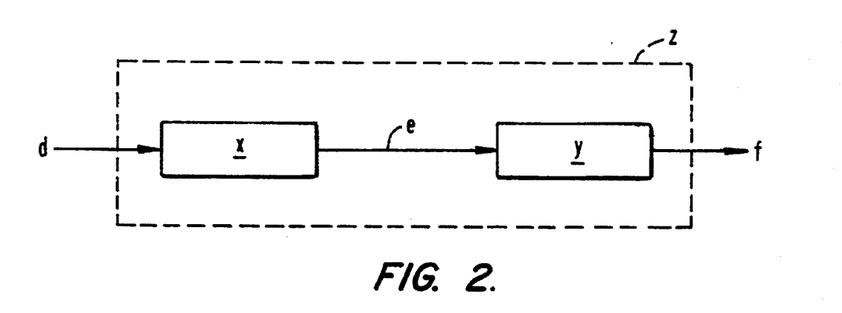
FIG. 2 is a block diagram illustrating a technique for combining triple logic column circuits.

FIG. 2 illustrates how two triple logic column circuits, for example, two circuits such as shown in FIG. 1, may be combined. The two triple logic column circuits are designated X and Y. Circuit X receives input signal d and provides output signal e. Circuit Y is coupled to receive output signal e from circuit X, and in turn provide output signal f. The two circuits together form a composite circuit Z. Assume that X and Y are each synthesized in triple logic column form. Thus, circuit X for the input signal d and the output signal e, has functions XDDde, XDUde, XUDde, XUUde and XHOLDd, and circuit Y has similar functions, but for the input-output signal pair ef. It is desired to find the corresponding functions for the composition, namely ZDDdf, ZDUdf, ZUDdf, ZUUdf, and ZHOLDd.

There are two ways in which the output signal f can go low for a falling critical input signal d. Either both X and Y are in the DD condition, or X is in the DU condition and Y is in the UD condition. Similarly, two conditions pertain for each of the other composite functions. Therefore the composite functions are:

ZDDdf=(XDDde & YDDef)∪(XDUde & YUDef)

ZDUdf=(XDUde & YUUef)∪(XDDde & YDUef)

ZUDdf=(XUDde & YDDef)∪(XUUde & YUDef)

ZUUdf=(XUUde & YUUef)∪(XUDde & YDUef)

where the symbol "&" means "AND", and the symbol "∪" means "OR".

Figure 3:
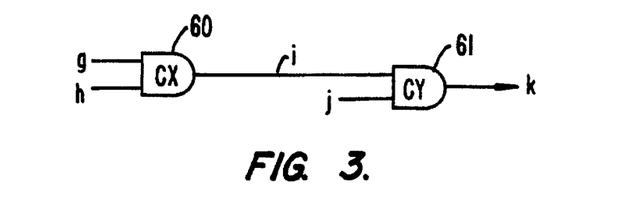
FIG. 3 is a block diagram illustrating cascaded Muller C elements.

FIG. 3 illustrates another composite circuit. In this case, a pair of cascaded Muller C elements are shown. The first Muller C element CX 60 is connected to receive input signals g and h, and provide an output signal i. The second Muller C element CY 61 is connected to receive as input signals i and j, and provide output signal k. For the first cascaded CX element shown in FIG. 3, the separate functions are:

| | |
|---|---|
| XDDgi = ¬h | XDDhi = ¬g |
| XDUgi = FALSE | XDUhi = FALSE |
| XUDgi = FALSE | XUDhi = FALSE |
| XUUgi = h | XUUhi = g |

For the second Muller CY element, the separate functions are:

| | |
|---|---|
| YDDik = ¬j | YDDjk = ¬i |
| YDUik = FALSE | YDUjk = FALSE |
| YUDik = FALSE | YUDjk = FALSE |
| YUUik = j | YUUjk = i |

Therefore, for the composite circuit CZ, referred to as just Z below:

ZDDgk=(XDDgi & YDDik)∪(XDUgi & YUDik), and DU=UD=FALSE

ZUUgk=(XUUgi & YUUik)∪(XDUgi & YDUik), and DU=UD=FALSE

ZDDhk=(XDDhi & YDDik)∪(XDUhi & YUDik), and DU=UD=FALSE

ZUUgk=(XUUgi & YUUik)∪(XUDgi & YDUik), and DU=UD=FALSE.

| | |
|---|---|
| YDDjk = ¬i | YUUjk = i |

Figure 4:
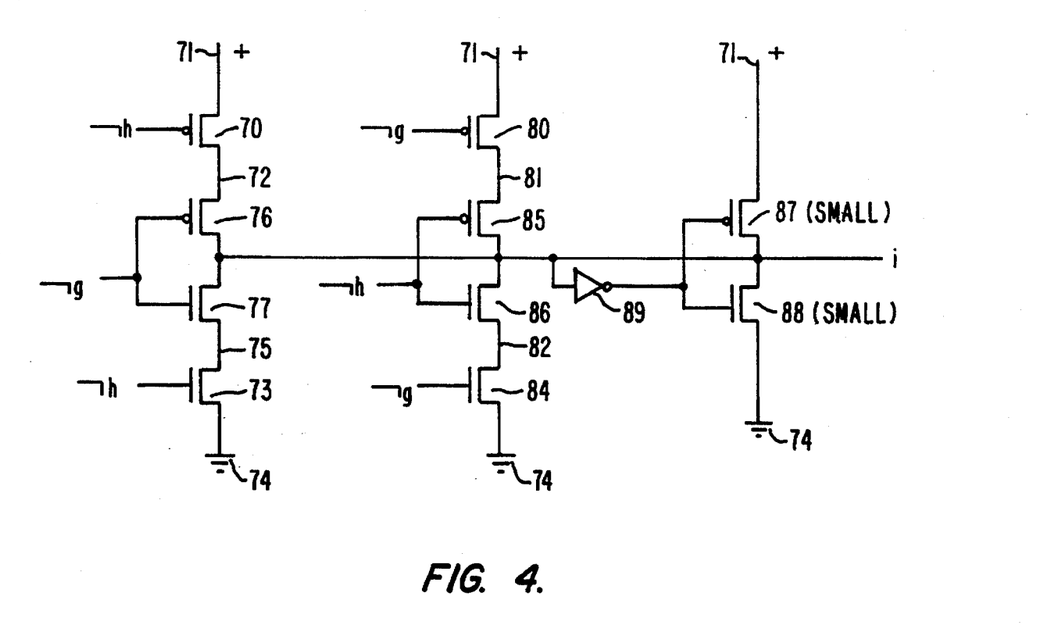
FIG. 4 is a circuit schematic illustrating a triple logic column form of a single Muller C element.

FIG. 4 is a detailed circuit schematic of the first one of the Muller C elements 60 shown in block form in FIG. 3. As shown, the triple logic column circuit includes three logic columns, similar to those of FIG. 1. The first logic column includes a PMOS transistor 70 coupled between a positive potential 71 and a node 72. The gate of transistor 70 is controlled by an input signal ¬h. Also included in the first logic column is an NMOS transistor 73 coupled between ground 74 and a node 75. The state of NMOS transistor 73 is also controlled by input signal ¬h. Between nodes 72 and 75 an inverter consisting of PMOS transistor 76 and NMOS transistor 77 is provided. The inverter is controlled by a critical input signal ¬g and provides an output signal i. The state of output signal i is controlled by input signals g and h. For example, if g and h are both low, then transistors 70 and 76 are on, pulling output signal i high. If input signals g and h are both high, then transistors 73 and 77 are on, pulling output signal i low.

The second logic column of the circuit shown in FIG. 4 includes a PMOS transistor 80 coupled between positive potential 71 and a node 81. PMOS transistor 80 is controlled by input signal ¬g. Similarly, NMOS transistor 84 is connected between ground 74 and a node 82. The gate of transistor 84 is controlled by input signal ¬g. Another inverter consisting of PMOS transistors 85 and NMOS transistor 86 is coupled to node i and to receive critical input signal ¬h.

Finally, the circuit shown in FIG. 4 includes a another embodiment of a holder logic column different from the one depicted in FIG. 1 in which two small transistors 87 and 88 are connected to an inverter 89 and to the output node. As shown by the figure, changes in inputs signals g or h will not change the output signal i from the third logic column, because there is no connection between input signals g and h and the third logic column. The reason that transistors 87 and 88, as well as the transistors forming inverter 89, are small is to allow their condition to be overridden by the follower and reverser logic columns of the triple logic column circuit. Importantly, with respect to FIG. 4 notice that the triple logic column logic columns DU and UD do not appear. Although not shown in the figure, Muller C element 61 may be synthesized in an identical manner, but using input signals i and j instead of signals g and h.

Figure 5:
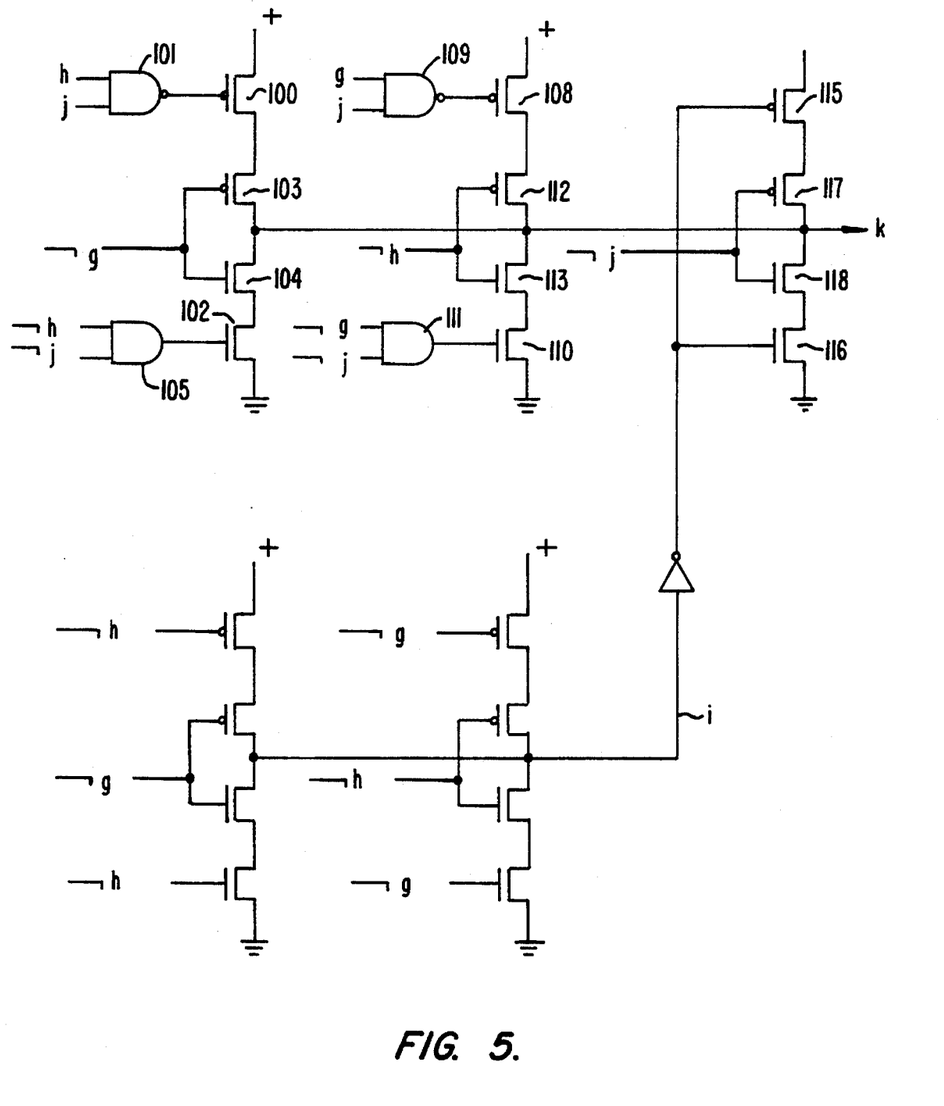
FIG. 5 is a circuit schematic illustrating the cascaded Muller C elements in triple logic column form.

FIG. 5 is a detailed circuit schematic illustrating the composite synthesis of triple logic column circuits to form the cascaded Muller C element shown in block form in FIG. 3. The lower portion of FIG. 5 corresponds to FIG. 4, and so that portion of the Figure is not described again here. The upper portion of FIG. 5, also a triple logic column circuit, consists of three logic columns. In the first logic column, the PMOS transistor 100 is controlled by NAND gate 101 coupled to receive input signals h and j. In the lower portion of that logic column, NMOS transistor 102 is controlled by AND gate 105 coupled to receive the complementary signals ¬h and ¬j. Between the gates 101 and 105, an inverter consisting of PMOS transistor 103 and NMOS transistor 104 is coupled to receive the complementary critical input signal ¬g. The output of the inverter is output signal k.

In the next logic column, PMOS transistor 108 is controlled by NAND gate 109 coupled to receive input signals g and j. NMOS transistor 110 is controlled by AND gate 111 coupled to receive the complementary input signals ¬g and ¬j. Another inverter, consisting of PMOS transistor 112 and NMOS transistor 113 has its input connected to receive the complementary signal ¬h and its output controlling signal k. Finally, a third logic column includes PMOS transistor 115 and NMOS transistor 116 connected to receive the inverted output signal from the lower portion of FIG. 5. Another inverter, this one consisting of PMOS device 117 and NMOS device 118 is connected to receive the complementary critical input signal ¬j. Thus, the cascaded Muller C elements have been synthesized in triple logic column form.

A second example of a composite circuit is a four to two phase converter. This example to be synthesized using triple logic column form circuitry begins with the toggle circuit illustrated as a block diagram in FIG. 6. The toggle produces a change in n whenever its input m rises, and a change in o whenever its input m falls. The triple logic column form of this circuit has some missing terms. In particular, because falling m never changes output n, DDmn and DUmn are both false. Similarly, UDmo and UUmo are also false.

Figure 6:
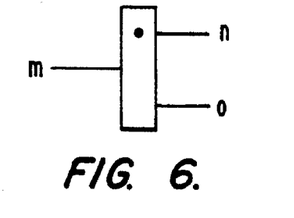
FIG. 6 is a block diagram illustrating a toggle circuit.
Figure 7:
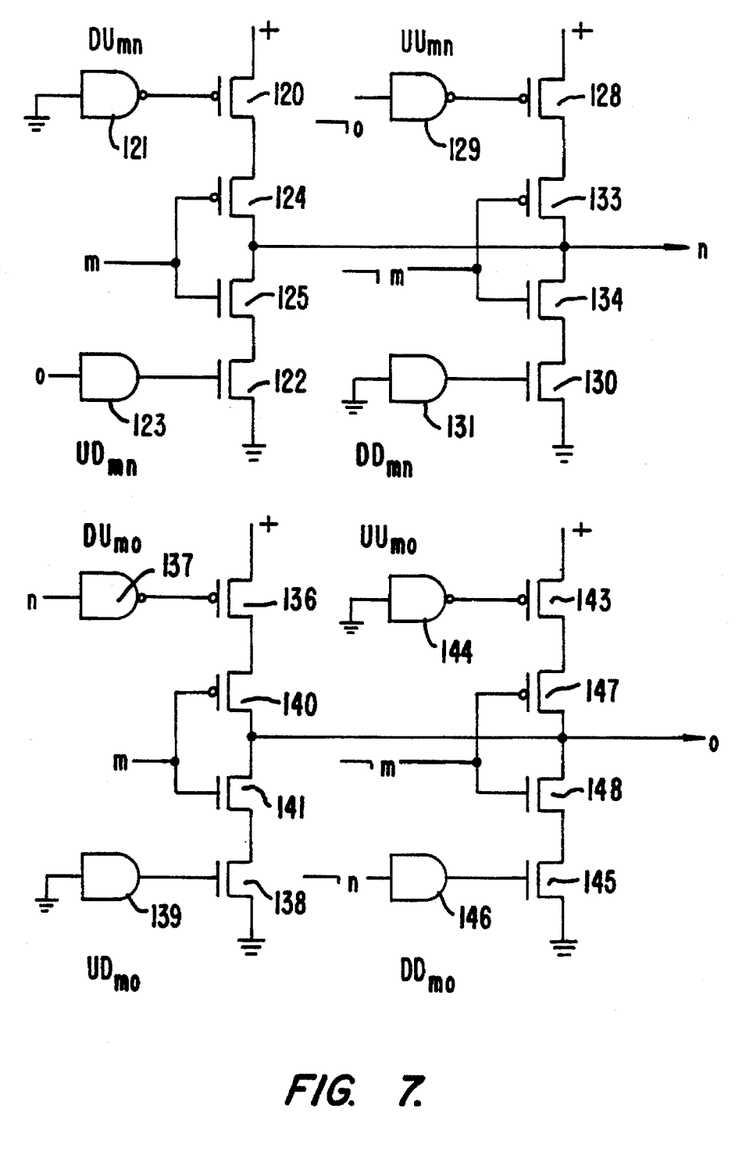
FIG. 7 is a circuit schematic illustrating a toggle circuit in triple logic column form.

FIG. 7 is a detailed circuit schematic of the toggle circuit shown in block form in FIG. 6, when implemented in a triple logic column form. The circuit shown in FIG. 7 includes an upper portion and a lower portion, which each receive input signal m, with the upper portion also receiving input signal o, and the lower portion also receiving input signal n.

In a similar manner to that described in conjunction with earlier figures, the upper portion of the circuit includes a PMOS transistor 120 connected to receive the output of a NAND gate 121. NAND gate 121 has its input coupled to ground. In the same logic column, an NMOS transistor 122 is coupled to receive the output of AND gate 123, which receives input signal o. The inverter formed by transistors 124 and 125 is connected between transistors 120 and 122 and receives critical input signal m.

The second logic column of the circuit has a PMOS transistor 128 connected to NAND gate 129, and an NMOS transistor 130 connected to AND gate 131. The input of AND gate 131 is coupled to ground, while the input of NAND gate 129 is coupled to receive the complementary signal ¬o. Another inverter consisting of transistors 133 and 134 is provided in this logic column, and is connected to receive the complementary critical signal ¬m, and provide an output signal n.

The lower portion of FIG. 7 includes a similar circuit in which PMOS transistor 136 is controlled by NAND gate 137, and NMOS transistor 138 is controlled by AND gate 139. NAND gate 137 receives input signal n, and NAND gate 139 has its input coupled to ground. An inverter formed by transistors 140 and 141 is controlled by critical input signal m. In the second logic column PMOS transistor 143 is controlled by NAND gate 144, having an input coupled to ground, and NMOS transistor 145 is controlled by AND gate 146, having its input signal coupled to receive the complementary signal ¬n. Another inverter formed by transistors 147 and 148 receives the complementary critical input signal ¬m.

The operation of the toggle is as follows. Assume that initially all variables are low. UUmn and DDmo will be enabled, and because ¬m is high, output o will be low. When the input signal m rises, UUmn will drive output n high, which turns off DDmo, but the effect of DDmo was already off when ¬m fell. Output n rising also turns on DUmo, but with input m now high, this has no effect on o. This operation continues with each change in an output variable enabling a new function which will come into effect only after the next change in the input variable. As will be described this toggle circuit is used in the converter, along with the merge circuit described below.

Figure 8:
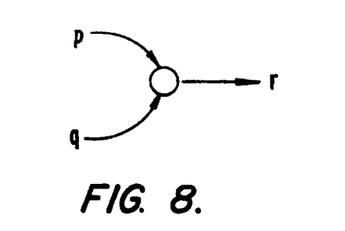
FIG. 8 is a block diagram illustrating a merge circuit.

The next portion of the circuit to be synthesized is a merge circuit FIG. 8 illustrates a merge circuit in block diagram form. The merge circuit provides an output signal r when both input terminals receive input signals p and q.

Figure 9:
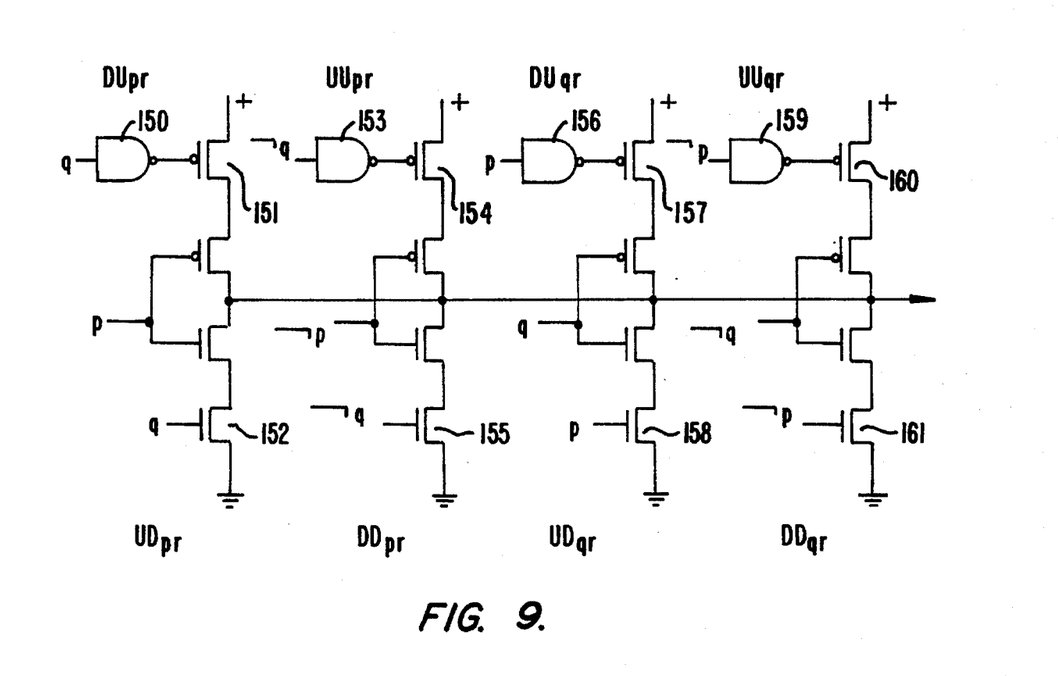
FIG. 9 is a circuit schematic illustrating a merge circuit in triple logic column form.

FIG. 9 is a detailed circuit schematic of the merge circuit implemented using triple logic column form. As shown in FIG. 9, input signal q controls NAND gate 150, and thereby PMOS transistor 151, and also controls NMOS transistor 152. Its complement ¬q is applied to NAND gate 153 controlling PMOS transistor 154, and to NMOS transistor 155. In each of these first two logic columns, critical input p and its complementary signal ¬p are applied to the respective inverters in those logic columns.

In the third logic column of the merge circuit, input signal p controls NAND gate 156 and thereby PMOS transistor 157, and also NMOS transistor 158. The complementary signal ¬p controls NAND gate 159 and therefore PMOS transistor 160, as well as NMOS transistor 161. Critical input signal q and its complementary signal ¬q control the respective inverters in the third and fourth logic columns of the merge circuit.

As shown, the triple logic column merge has four legs, two dealing with changes in each of its two inputs. Notice in this circuit that the functions DU and UU in the upper row are shown with a single input NAND gate, i.e., an inverter. This is necessary for clarity because the upper transistors are active for low input. In fact, the circuit is just a familiar form of the XOR circuit.

Figure 10:
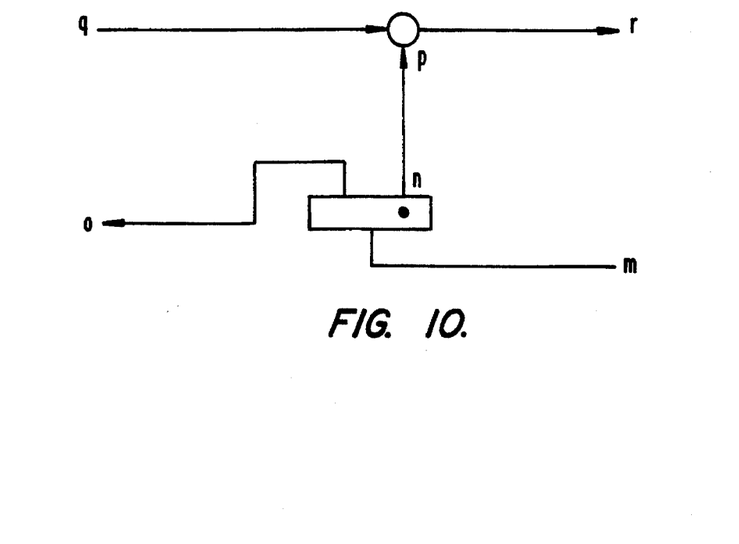
FIG. 10 is a block diagram illustrating a four to two phase conversion circuit.

FIG. 10 is a block diagram illustrating the combination of the toggle and merge circuits that form a four-to-two phase converter. The operation of the converter is as follows. Assume that all input signals are low. Next, assume q changes because of external logic. This will cause signal r to rise. In response to that, other logic (not shown) will cause signal m to rise. The rising m causes signal n to rise. This causes signal p to rise, in turn causing signal r to fall. This causes signal m to fall and signal o to rise. Now signals m and r are low and signals q and o are high. Thus, by this time signals m and r have had two transitions while signals o and q have had a single transition. Now signal q falls (signal p was high), therefore signal n goes low and therefore signal r goes low. This causes signal o to go low. Thus, as has been described, whenever signal m rises it changes signal n, and whenever signal m falls it changes signal o.

Figure 11:
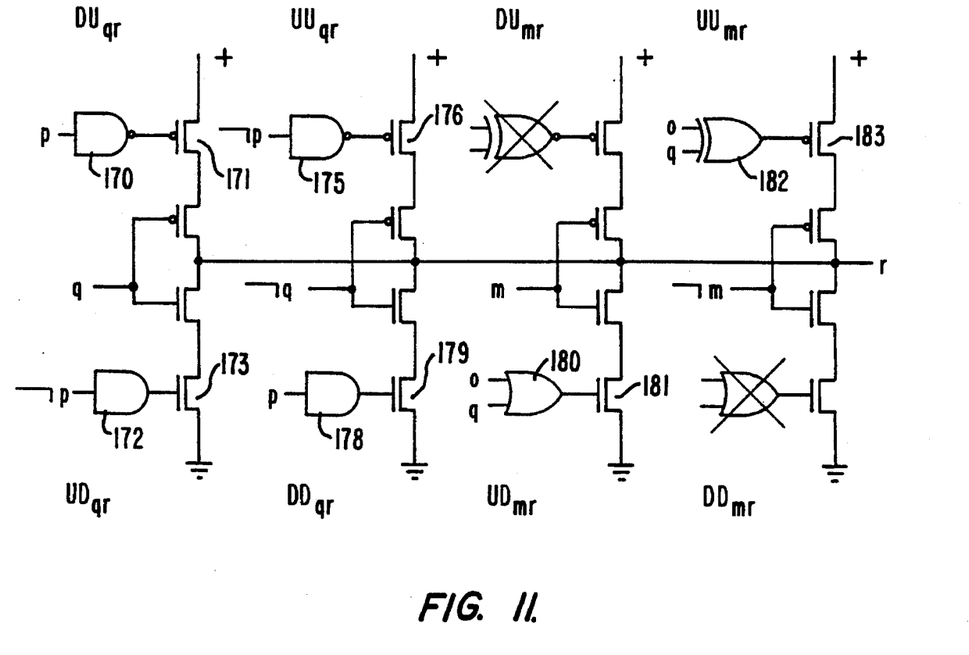
FIG. 11 is a circuit schematic illustrating a four to two phase conversion circuit in triple logic column form.

FIG. 11 together with FIG. 7 illustrates the synthesis of the circuit shown in FIG. 10 in detail. Input signal p controls NAND gate 170, which in turn controls PMOS transistor 171. Also in that logic column the complementary input signal ¬p controls AND gate 172 and therefore NMOS transistor 173 In the second logic column, the complement ¬p controls NAND gate 175 and PMOS transistor 176, while input signal p itself controls AND gate 178 and NMOS transistor 179.

In the third logic column of the circuit, only input signals o and q are required to control exclusive OR circuit 180 controlling NMOS transistor 181. In the fourth logic column of the circuit the same input signal o and q control exclusive OR gate 182, which controls PMOS transistor 183. Input signals q and m, and their complements, are applied to inverters in the logic columns of the circuit.

Notice in FIG. 11 that two of the functions are FALSE, namely DUmr and DDmr. This corresponds to the fact that falling transitions of input signal m are routed to output o and have no effect on output r. The functions UDmr and UUmo turn out to test the equality of signals o and q. When o=q, UUmr is active; when o=¬q, UDmr is active. Actually, because of the way the four to two phase converter works, UUmr will never do anything because m changes only when o and q differ. Were one to cause a rising transition on a initially, UUmr would be active and f would immediately rise also.

The foregoing has been a description of the preferred embodiments of the invention. Although specific triple logic column circuits have been described, it should be understood that the scope of the invention is defined by the appended claims.

What is claimed is:

1. A circuit comprising:

a signal output node;

a first logic column including first logic, a first inverter, and a first logic column output node coupled to the signal output node, the first logic column connected to receive first logic column input signals and in response supply a first logic column output signal to the first logic column output node, some of the first logic column input signals being supplied to the first logic, and at least one first logic column input signal being supplied to the first inverter;

a second logic column including second logic, a second inverter, and a second logic column output node coupled to the signal output node, the second logic column connected to receive second logic column input signals and in response supply a second logic column output signal to the second logic column output node, some of the second logic column input signals being supplied to the second logic, and at least one second logic column input signal being supplied to the second inverter; and wherein the at least one first logic column input signal comprises a selected input signal and the at least one second logic column input signal comprises a signal complementary to the selected input signal.

2. A circuit as in claim 1 wherein the at least one first logic column input signal comprises a critical input signal and the at least one second logic column input signal comprises a complementary signal to the critical input signal.

3. A circuit as in claim 2 wherein the first logic column input signals and the second logic column input signals comprise non-critical input signals.

4. A circuit as in claim 3 wherein the non-critical input signals arrive prior to the critical input signal to activate one of the first logic column and the second logic column.

5. A circuit as in claim 1 wherein the first logic further comprises first upper logic and first lower logic, the first inverter being connected between the first upper logic and the first lower logic.

6. A circuit as in claim 5 wherein the second logic further comprises second upper logic and second lower logic, the second inverter being connected between the second upper logic and the second lower logic.

7. A circuit as in claim 6 wherein a first potential source is coupled to the first upper logic and to the second upper logic, and wherein a second potential source is coupled to the first lower logic and to the second lower logic, whereby the first inverter is connected to the first potential source when the first upper logic is enabled and the first inverted is connected to the second potential source when the first lower logic is enabled, and the second inverter is connected to the second potential source when the second upper logic is enabled and the second lower logic is connected to the second potential source when the second lower logic is enabled.

8. A circuit as in claim 1 wherein the at least one first logic column input signal comprises a single signal, wherein the at least one second logic column input signal comprises a single input signal, and wherein the first logic column input signal and the second logic column input signal are complementary.

9. A circuit as in claim 8 wherein the first upper logic is coupled between a higher potential source and the first inverter, and the first lower logic is coupled between a lower potential source and the first inverter.

10. A circuit as in claim 9 wherein the second upper logic is coupled between a higher potential source and the-second inverter, and the second lower logic is coupled between a lower potential source and the second inverter.

11. A circuit as in claim 1 wherein the first upper logic includes a first upper transistor connected between the first inverter and a higher potential source, and the first lower logic includes a first lower transistor connected between the first inverter and a lower potential source.

12. A circuit as in claim 11 wherein the first inverter comprises a first pair of complementary transistors having commonly connected gate electrodes, one of the pair being connected between the first lower transistor and the first logic column output node, and the other of the pair being connected between the first upper transistor and the first logic column output node, the at least one first logic column input signal being supplied to the commonly connected gate electrodes.

13. A circuit as in claim 12 wherein the second upper logic is coupled between a higher potential source and the second inverter, and the second lower logic is coupled between a lower potential source and the second inverter.

14. A circuit as in claim 13 wherein the second upper logic includes a second upper transistor connected between the second inverter and a higher potential source, and the second lower logic includes a second lower transistor connected between the second inverter and a lower potential source.

15. A circuit as in claim 14 wherein the second inverter comprises a second pair of complementary transistors having commonly connected gate electrodes, one of the pair being connected between the second lower transistor and the second logic column output node, and the other of the pair being connected between the second upper transistor and the second logic column output node, the at least one second logic column input signal being supplied to the commonly connected gate electrodes.

16. A circuit as in claim 1 further comprising a third logic column including third logic, a third inverter, and a third logic column output node coupled to the signal output node, the third logic column connected to receive third logic column input signals and in response supply a third logic column output signal to the third logic column output node, some of the third logic column input signals being supplied to the third logic, and at least one third logic column input signal being supplied to the third inverter.

17. A three logic column circuit comprising:

an output node having a potential;

a first logic column coupled to the output node and coupled to receive first logic column input signals and in response thereto control the potential of the output node, the first logic column including a first portion coupled to receive noncritical input signals and a second portion coupled to receive critical input signals, the first portion enabling the second portion to be coupled between two potential sources;

a second logic column coupled to the output node and coupled to receive second logic column input signals and in response thereto control the potential of the output node, the second logic column including a first portion coupled to receive noncritical input signals and a second portion coupled to receive critical input signals, the first portion enabling the second portion to be coupled between two potential sources;

a third logic column coupled to the output node and coupled to receive third logic column input signals and in response thereto control the potential of the output node, the third logic column including a first portion coupled to receive noncritical input signals and a second portion coupled to receive critical input signals, the first portion enabling the second portion to be coupled between two potential sources; and wherein the third logic column retains the potential of the output node.

18. A circuit as in claim 17 wherein each of the first, second and third logic column itself includes a pair of circuits and an inverter, one circuit of the pair switchably connecting the corresponding inverter to an upper potential source, the other circuit of the pair switchably connecting the corresponding inverter to a lower potential source.

19. A circuit as in claim 18 wherein the critical input signal is coupled to one of the inverters and a signal complementary to the critical input signal is coupled to another of the inverters.

20. A circuit as in claim 17 further comprising additional logic columns coupled to the output node and to additional critical input signals.

* * * * *